Dec. 21, 1965

J. W. MAYER 3,225,198

METHOD OF MEASURING NUCLEAR RADIATION UTILIZING A
SEMICONDUCTOR CRYSTAL HAVING A LITHIUM
COMPENSATED INTRINSIC REGION

Filed May 16, 1961

INVENTOR.
JAMES W. MAYER,
BY
Charles S. Haughey
ATTORNEY.

United States Patent Office
3,225,198
Patented Dec. 21, 1965

3,225,198
METHOD OF MEASURING NUCLEAR RADIATION UTILIZING A SEMICONDUCTOR CRYSTAL HAVING A LITHIUM COMPENSATED INTRINSIC REGION
James W. Mayer, Pacific Palisades, Calif., assignor to Hughes Aircraft Company, Culver City, Calif., a corporation of Delaware
Filed May 16, 1961, Ser. No. 110,499
11 Claims. (Cl. 250—83.3)

This invention relates generally to nuclear radiation detection, and more particularly to apparatus and a system comprising a semiconductor PIN junction device for detecting and discriminating a variety of nuclear radiation particles such as alpha particles, electrons, protons, neutrons, and other nuclear radiation such as gamma rays and the like.

PN junction semiconductor devices are known for detection of nuclear charged particles, and when containing neutron-sensitive material such as boron, for detection of neutrons. In the copending application of Messrs. Denney, Friedland and Keywell, Serial No. 816,826, of common assignee, now abandoned, the mechanism for generation of charges in the depletion region of reverse biased PN junctions of semiconductor crystals is explained, and the desirability of wide depletion regions in nuclear particle detectors is pointed out. In the copending application of Messrs. Friedland, Mayer and Wiggins, Serial No. 4,560, of common assignee, now U.S. Patent No. 3,043,955, a device construction to produce wide depletion layers with thin surface regions in PN junction nuclear particle radiation detectors is disclosed, and the importance of wide depletion layers and thin surface regions for linear response to charged particles is explained. The devices according to the teachings of Serial No. 4,560 above referred to have made possible particle spectrometers for alpha particles; and with sufficiently high resistivity silicon semiconductor material, linear response of pulse height versus alpha particle energy is obtained. With 3 ohm cm. silicon crystal material, linearity was not obtained, but with 300 ohm cm. or better, linearity was obtained for up to 6 m.e.v. alpha particles under 10.5 v. or greater reverse bias. To obtain linearity up to 9 m.e.v., bias in excess of 10.5 v. was required for 300 ohm cm. base crystal resistivity, although in 1,000 ohm cm. base crystal material, linearity was achieved up to about 7 m.e.v. at 1.5 v. reverse bias.

In such crystal detector systems as diffused silicon PN junction semiconductor systems, extremely high resistivity crystal material is required to obtain linear response to nuclear particle radiation; and relatively high bias voltages, well in excess of 10.50 v., are required for alpha particle linear response detection unless very highly resistive base crystal material, in excess of 300 ohm cm. resistivity, is used. In such crystal detectors the noise level coupled with the relatively narrow depletion width generally precludes even detection of gamma rays or electrons, and linear response thereto is not obtained. The width of depletion layer required to trap all, or substantially all, charge carriers generated in the crystal to contribute to the pulse obtained is greater by a factor of about four for protons over alpha particles of comparable energies and is considerably greater for electrons or gamma rays with these energies. Proportionately higher resistivity material base crystals suitable for detection of light particles such as electrons and gamma rays is unavailable.

It is generally believed that reverse-biased depletion regions greater than 1 mm. deep are unattainable in the present state of the art. Silicon semiconductor crystal material of 6,000 ohm cm. resistivity is considered to be the highest commercially attainable resistivity material at the present state of the art, although crystals, or portions thereof, of up to 10,000 ohm cm. resistivity have been fortuitously produced. Silicon crystal devices have been operated in reverse bias up to 500 volts (v.) the surface leakage generally setting the maximum. The depletion width in microns across a reverse-biased junction, wherein the electric field is contained, may be approximated by the equation:

(1) $$\omega = \frac{(pV)^{\frac{1}{2}}}{3}$$

Thus for silicon semiconductor base material of resistivity=10,000 ohm cm., and a maximum of 500 volts, $$\omega = \frac{(10,000 \times 500)}{3}^{\frac{1}{2}} \cong 800$$

microns or 0.8 mm.; and a depletion width $\omega$ of less than 1 mm. thus seems to be a practical maximum.

The noise level in nuclear particle detectors and spectrometers has heretofore masked signals from small particles such as electrons and gamma rays.

In all known PN junction semiconductor crystal nuclear radiation detectors and particle spectrometers, as depletion regions are increased toward about 0.8 mm. the noise levels become too high to effectively measure light particles such as electrons, or gamma rays. While precise explanation of noise sources in such devices is not presently available, generally the noise level increases with increased bias. From this and Equation 1 it follows that for a constant depletion width, decreasing resistivity requires increasing bias voltage which in turn produces higher noise levels.

This invention provides in a base crystal which may be of relatively low resistivity a PIN junction semiconductor nuclear radiation particle spectrometer element having depletion widths which may be in excess of 1 mm. along with low noise levels, which may be operated with reduced bias, and which may be used in a nuclear radiation detection process to obtain pulse response to particle energy of light mass radiation particles.

An ideal, or universal, detector unit would be one having a depletion region extending within about one micron of the surface to obtain substantially linear response to heavier nuclear particles, such as alpha particles, having very deep depletion regions greater than 1 mm. deep so that light particles such as electrons and gamma rays may deposit their energy within the depletion region to give a linear response, and to have low noise level operation. It is also desired to have a detector which is very stable in operation, and whose characteristics are not easily destroyed in usage.

This invention provides such a detector unit, and makes possible nuclear particle spectrometer systems having wide detection and measurement capabilities. Other advantages of this invention will be apparent from the balance of this specification, disclosing the preferred embodiment of my invention, and in the accompanying drawing and claims forming a part thereof, wherein:

Figure 1:
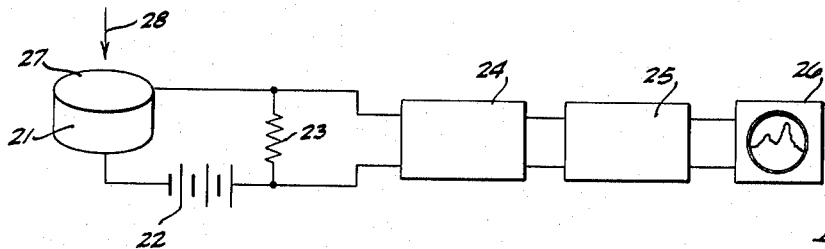
FIG. 1 is a schematic representation of a detector system according to this invention.

The circuit shown in FIG. 1 includes a PN junction semiconductor device 21, preferably a silicon semiconductor device to be described, electrically connected to a battery 22 and a load resistor 23 for bias and external circuit impedance signal generation, and to a pulse amplifier 24, a pulse height amplitude discriminator 25, and an oscilloscope 26 for display of information. Radiation to be received by the detector device 21 enters the incident surface 27 of the device on a path indicated by the arrow 28, preferably perpendicular to the surface 27.

This invention was made possible by the discovery that PN junctions may be formed in semiconductor materials, such as silicon, germanium and compounds such as gallium arsenide, by indiffusing impurity type determining material of the type which diffuses interstitially, by the ion drift technique, which will produce a substantially fully compensated, or intrinsic, zone at the PN junction. When reverse biased, this intrinsic zone becomes the center and major portion of the depletion region of the junction, and the width of the depletion region upon reverse bias is greater by about the width of the compensated intrinsic zone than normally obtained by such reverse bias. Hence deep depletion regions are obtainable at relatively low bias. The resistivity of such intrinsic zone is substantially greater than normally obtainable in bulk crystals in the present state of the art, and the noise level of the reverse biased PIN junction device is markedly lower than is found in PN junction devices with comparable depletion depths.

Although any interstitial diffusant of either type may be used to form a PN junction by the ion drift technique in any semiconductor crystal of opposite conductivity type, the lower mass elements are preferred. Lithium diffuses interstitially into silicon, and is a very low mass element, hence it is preferred as a N-type diffusant. Boron doped silicon semiconductor material is commercially available as a P-type crystal and is well suited for producing stable devices, for reasons which will subsequently appear. Accordingly, this invention is illustrated with a lithium diffused (by ion drift technique) boron doped silicon PN junction semiconductor device. A method of forming the lithium ion drift diffused junction per se, and some of its properties, have been discussed by E. M. Pell, J. Applied Physics 31, 291 (1960). It is a characteristic of the ion drift diffusion process, as will presently appear, that an excessive diffusion time will deplete the surface diffusant concentration, often irregularly over a broad surface, making it very difficult to control the diffusion process to produce very thin high diffusant surface concentrations useful for nuclear particle detectors. By prediffusing a shallow surface region with a dopant which is not subject to the ion drift diffusion process, a predetermined surface condition may be established, and extended time in the ion drift process will serve only to extend the intrinsic region, making the resulting crystal insensitive to excessive diffusion time.

In making a lithium-diffused silicon detector crystal, a surface N-type region of excess lithium dopant concentration is normally retained. By prediffusing the crystal surface with phosphorus, by conventional techniques, a predetermined N-type impurity distribution may be established which will remain if the lithium is diffused to fully compensated, or intrinsic, concentration immediately adjacent the surface phosphorus-diffused region. Of course other N-type dopant materials may be used in lieu of phosphorus, as well as other doping processes, before the lithium ion-drift diffusion process. Arsenic, antimony or bismuth may be used, and a vapor deposition-alloy doping process may be used to prepare the N-doped surface region prior to the lithium ion drift process.

The ion drift method of interstitially diffusing lithium into germanium and silicon is well known, and is further discussed in an American Chemical Society monograph, "Semiconductors," edited by Hannay, Reinhold Publishing Corporation 1959 and in publications cited therein, pages 235 et seq. The ion drift method of diffusing electrical conductivity type determining impurity into a semiconductor consists essentially of diffusing an interstitial diffusant at relatively low temperature under influence of an electrical field established in a junction device by reverse biasing the device. The process thus depends upon the existence of the junction, the proper bias, a temperature at which diffusion will occur, and time.

Figure 2:
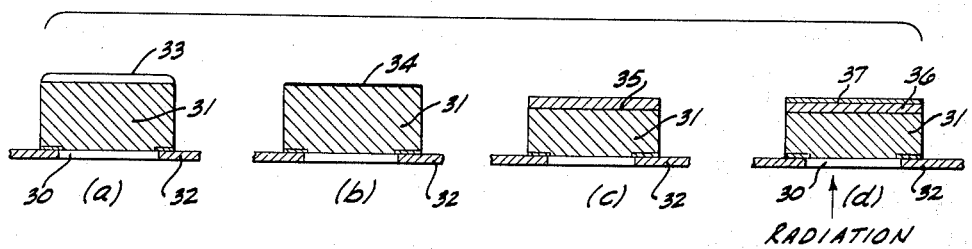
FIG. 2 is a step diagram for an ion drift diffusion process.

A particle radiation detector and spectrometer crystal device according to this invention may be produced in low resistivity silicon semiconductor material, such as boron-doped P-type 14 ohm cm. silicon. Preferably the crystal will be predoped with phosphorus to a depth of one micron to establish a final desired surface N-type region. In one example, as illustrated in FIG. 2, a one inch diameter, 5 cm. thick slab of 15 ohm cm. silicon 31, suitably lapped, cleaned, and predoped with phosphorus, was mounted on a gold-boron clad Kovar tab 32 having an opening or window 30, making a boron doped ohmic contact to the crystal, and the top surface was coated with a suspension 33 of 30% lithium in mineral oil containing 1.7% oleic acid, as shown in FIG. 2a.

The slab with the mineral oil coating was dried at 200° C. for 20 minutes (100° to 200° may be used) in argon gas. The mineral oil is thus dried, being substantially vaporized, leaving a coating 34 of lithium on the crystal as shown in FIG. 2b.

The lithium was next alloyed and diffused into the silicon at 360° C. for 3 minutes, to a depth 35 of about 75 microns (the approximate range of an 11 m.e.v. alpha particle in silicon).

The slab was cooled, and its surface cleaned with a xylene, methyl alcohol, and water rinsing cycle to remove excess lithium powder, leaving the surface with about $10^{18}$ atoms/cc. of lithium, and at 75 microns depth about $10^{14}$ atoms/cc. of lithium. Since the original crystal of 14 ohm cm. material contained $10^{14}$ atoms/cc. of boron, the PN junction 35 is at 75 microns depth as shown in FIG. 2c.

Figure 3:
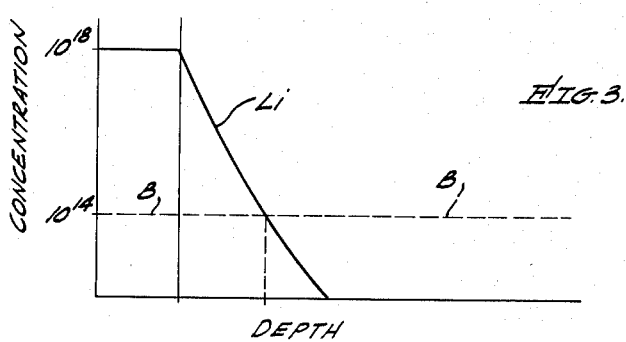
FIG. 3 is a schematic diagram showing lithium and boron concentrations in the silicon after normal lithium alloy-diffusion.

FIG. 3 shows the boron concentration, dashed line B, and the lithium concentration, solid line $L_i$, in the crystal of FIG. 2c.

The slab edges were etched in a 4:4:5 solution of HF, $HNO_3$ and HAc to electrically clean the junction edges.

Figure 4:
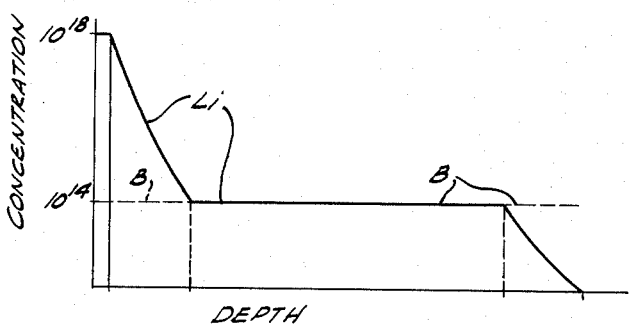
FIG. 4 is a schematic diagram showing lithium and boron concentrations in the silicon slab after ion-drift diffusion of lithium into the crystal.

The action ion drift diffusion step next subjected the crystal to a reverse bias of 100 volts for 36 hours at 175° C., producing (FIG. 2d) an intrinsic region 36 between the N and P regions 37 and 31 of the crystal. The impurity concentrations are now shown in FIG. 4, the compensated intrinsic region extending on the horizontal line between the upper lithium line on the left and the lower lithium line on the right.

Under reverse bias, the resulting structure produced a 2.8 mm. depletion width ω, the width being substantially independent of the bias voltage and co-extensive with the intrinsic region. It is noted that a bias of 20 v. here produced a width over 2.8 times the maximum heretofore attainable in ultra high resistivity material. The noise level of the device at this relatively low voltage was so low that gamma rays were easily distinguished.

The lithium concentration in the initial diffusion (disregarding the phosphorus) follows the error function distribution, $$N_{Li} = No \text{ erfc} \frac{x}{2(Dt)^{1/2}} \qquad (2)$$

where $N_{Li}$ is the lithium atom concentration at a time $t$ and a depth $x$, and where $D$ is the diffusion constant of lithium in silicon.

It has been shown by Pell, above noted, that the growth of the depletion region, $\omega$, may be approximated by $$\omega \approx (2\mu vt) \qquad (3)$$

where $v$ is the applied voltage, and $\mu$ is the lithium mobility at the diffusion temperature.

The ion-drift process depends upon the electric field in a reverse biased junction exerting its influence on the lithium ions to cause drift motion. Since it is necessary to maintain a junction, the maximum drift temperature is limited, in broadest terms, to that temperature at which the number of thermally generated carriers is comparable to the boron concentration. Such a temperature will produce a degenerate region in which neither N nor P-type carriers predominate, hence there will be no PN junction at a temperature below the maximum drift temperature, with a proper diffusant such as lithium in silicon or germanium, the lithium mobility will cause it to drift in the field established at the junction by the applied bias. Since a heavily doped crystal may be raised to a greater temperature before thermally generated carriers mask the excess dopant concentration, higher ion drift process temperatures may be used in lower resistivity material. Thus a drift temperature of 175° C. may be used for 14 ohm cm. material, but a maximum of 100° C. may be used for 10,000 ohm cm. material. In germanium material the temperatures will be correspondingly lower.

The preferred resistivity of the silicon crystal base material is 100 Ω cm., and a range of 1 to 1,000 Ω cm. is quite satisfactory. The ion drift process may be used for as low as .3 Ω cm. resistivity, but boron-lithium interaction reduces mobility of the lithium under ion-drift conditions, and a limited penetration of the lithium ions is obtainable. In high boron crystal material, the lithium tends to pair with the boron according to the equation $Li^+ + B^- = [Li\ B]$ immobilizing a fraction of the lithium and hence reducing the lithium mobility. Thus high boron content, i.e. low resistivity, base crystals are a limit on the ion drift process. It should be noted that the boron takes up a lattice position, hence has a much lower mobility than the lithium, and it is for this reason that lithium may be ion-drift diffused without affecting the boron.

There is also a high resistivity base crystal limit for the ion-drift diffusion process. At higher resistivities, i.e. above about 6,000 Ω cm., the temperature at which the junction must be maintained during diffusion to maintain the internal junction field is so low as to seriously reduce the diffusion rate.

Thus a practical range of silicon base resistivity crystals is about 1 to 1,000 ohm cm.

When oxygen is present in the crystal, lithium tends to combine with the oxygen according to the reaction.

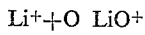

Although the lithium-boron pairing neutralized the lithium charge, the lithium-oxygen pairing does not, thus stabilizing, or immobilizing, the lithium but leaving its charge available to pair with the boron and thus to produce a net charge of zero, or an intrinsic crystal region. The oxygen in the silicon base crystal should preferably be about equal to the boron content, or @ $10^{14}$, but up to $10^{16}$ is very satisfactory. Above about $10^{17}$ oxygen content, the diffusion process is considerably reduced.

Figure 5:
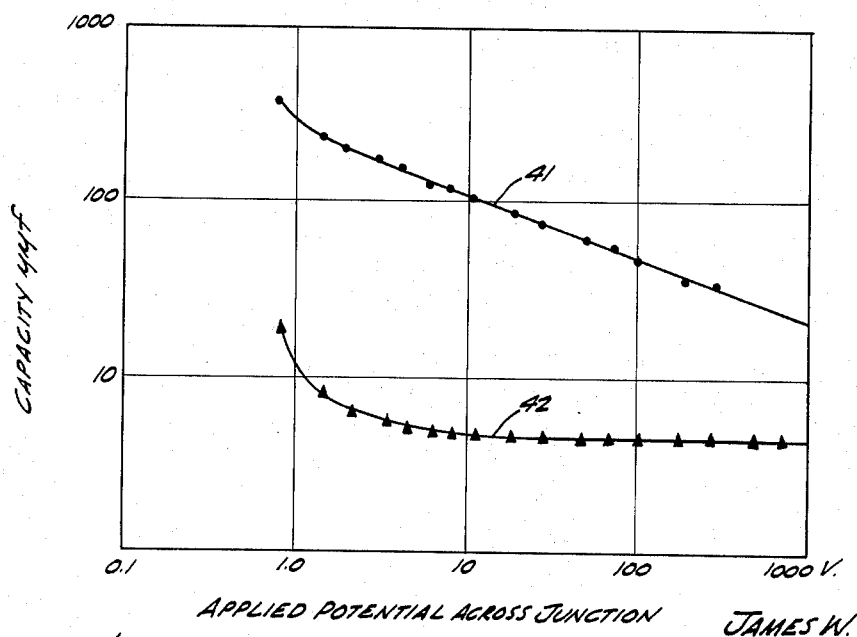
FIG. 5 is a chart showing voltage capacitance relationships in a lithium diffused silicon crystal before and after ion (drift) diffusion.

FIG. 5 shows capacitance vs. bias voltage for a lithium diffused silicon crystal before and after ion diffusion for 20 hours at 100 volts bias and 155° C. As shown in curve 41, capacitance of the PN junction before ion drift varied with applied voltage, whereas after the ion-drift step, with a wide intrinsic region in the device, curve 42 shows that the capacitance falls from about 1 to 10 volts bias, but holds essentially constant above 10 volts.

Figure 6:
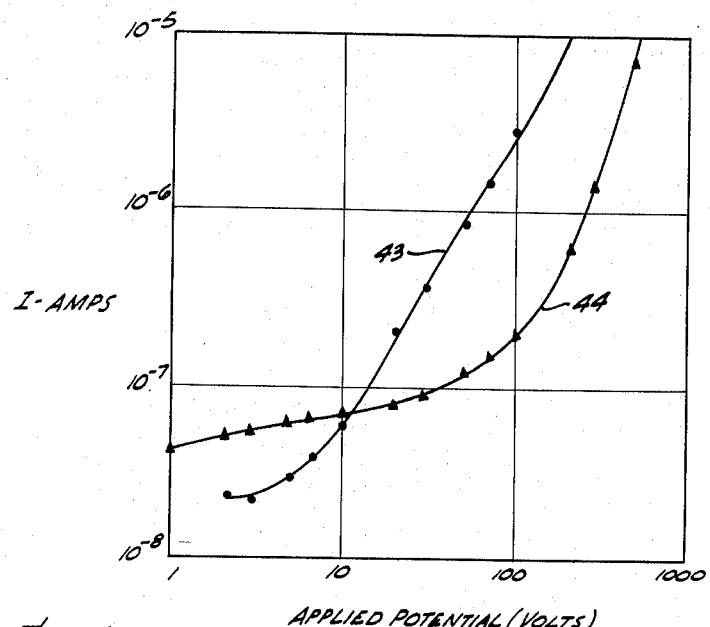
FIG. 6 shows a D.C. vs. voltage relation before and after ion drift in the exampled silicon crystal.

FIG. 6 shows the comparison of D.C. in the above device before (curve 43) and after (curve 44) the ion drift step. The D.C. is materially reduced above 10 volts after the ion-drift step paralleling the reduction in noise level due to the ion-drift step. Since bias of well in excess of 10 volts is required in normal PN junction devices, the use of PIN devices having a wide intrinsic region established by the ion-drift technique makes possible low noise measurement of current pulses from radiation events.

Figure 7:
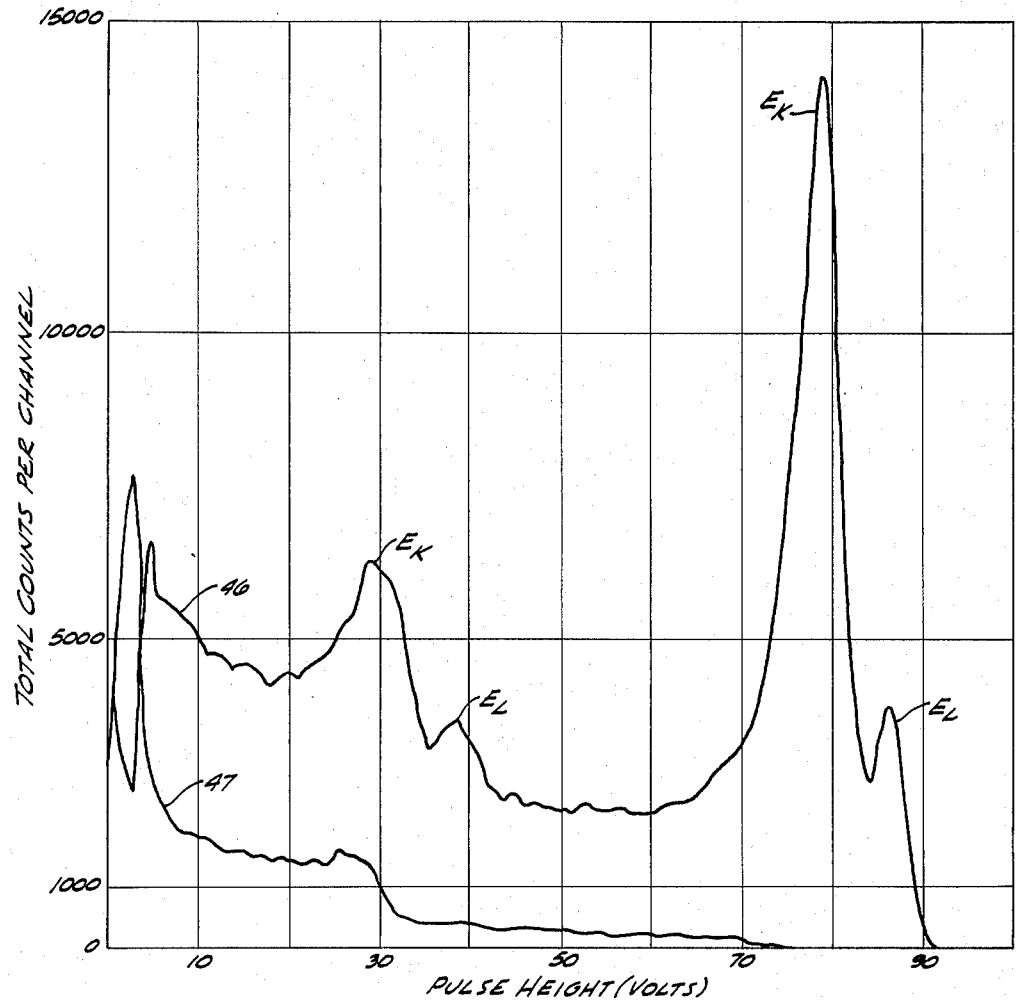
FIG. 7 shows response of a 2 mm. deep intrinsic region silicon detector, with lithium ion-diffused therein, to $Bi^{207}$ radiation up to 100 kev.

FIG. 7 shows the pulse height distribution in lithium ion-drifted silicon exposed to $Bi^{207}$ with a 1 cm.² crystal detector area, 2 mm. depth of depletion region at 60 volts bias. Compton edges Ev=570 kev. and Eg=1064 kev. are typical of silicon detectors response to gamma rays whose energy is greater than 100 kev., and are clearly distinguishable. Both sets of K and L lines are also clearly shown, Ek=480 kev., EE 553 kev., Ek=976 kev., and El=1049 kev.

That the pulse height distribution reflects the energy distribution of the Compton electrons created by the gamma rays which interact within the material. Over longer periods of pulse-height distribution measurement it is possible to resolve the photo peak which gives a direct indication of energy of the incident monoenergetic gamma rays.

Curve 46 shows response to $\beta$, and $\gamma$ rays, and curve 47 shows response to $\gamma$ rays only with a 5 mm. Lucite absorber over the source.

It is noted that using the ion-drift technique it is somewhat difficult to produce shallow junctions, or shallow N regions over the depletion region in the reverse-biased condition. It is, however, a relatively simple matter to ion-drift the lithium to the back side of the crystal and reduce the thickness of the P region to very shallow depths. In this way, a window through the base tab 32 allows radiation to enter the depletion region through a very thin P region where very little particle energy is lost without corresponding current pulse generation. It is preferred, however, to prediffuse phosphorus into the incident particle surface as before explained.

While the examples given are based on silicon base crystal material, germanium, or compound semiconductor materials such as GaAs, having higher band gaps, would be suitable if ion-drift diffused with an interstitial diffusant. The higher band gap allows higher ion diffusion temperatures to be used while maintaining the junction field for ion diffusion.

What is claimed is:

1. The method of measuring nuclear radiation which comprises: exposing to said radiation a semiconductor detector crystal having a lithium compensated intrinsic region therein between P and N type regions and measuring the electrical pulse generated by said radiation between said N and P type regions.

2. The method according to claim 1 wherein the crystal is of silicon and is maintained below 100° C.

3. The method according to claim 1 wherein the crystal is of silicon, and the bias voltage is maintained below 500 volts.

4. The method of measuring nuclear radiation energy which comprises: exposing to said radiation a silicon semi-conductor detector crystal having a lithium compensated intrinsic region therein between P and N type regions at a bias voltage between 10 and 500 volts, and measuring the electrical pulse induced by said radiation.

5. The method according to claim 4 wherein the electrical pulse is measured by measuring the voltage pulse across an impedance in an external circuit.

6. The method of measuring the energy of gamma radiation, which comprises: exposing said radiation to a silicon semi-conductor crystal having a lithium compensated intrinsic region therein between P and N type regions under bias, said bias and the width of said intrinsic region being sufficient to produce a depletion region in said crystal in excess of 1 mm. thick and measuring the electrical pulse generated by said radiation between said N and P type regions.

7. The method of measuring nuclear radiation energy which comprises: exposing to said radiation a semiconductor detector crystal having a lithium compensated intrinsic region therein between P and N type regions at a bias voltage between 10 and 500 volts, and measuring the electrical pulse induced by said radiation.

8. The method according to claim 4 wherein the electrical pulse is measured by measuring the voltage pulse across an impedance in an external circuit.

9. The method of measuring the energy of gamma radiation, which comprises: exposing to said radiation a semiconductor crystal having a lithium compensated intrinsic region therein between P and N type regions under bias, said bias and the width of said intrinsic region being sufficient to produce a depletion region in said crystal in excess of 1 mm. thick and measuring the electrical pulse generated by said radiation between said N and P type regions.

10. The method of measuring the source intensity of a nuclear radiation source, which comprises: exposing to said radiation a semiconductor crystal having a lithium compensated intrinsic region therein between P and N type regions under bias; and counting the number of radiation events per unit of time as evidenced by electrical pulses in the bias circuit.

11. The method according to claim 10 wherein the crystal is of silicon and the bias is from 10 to 100 volts.

References Cited by the Examiner
UNITED STATES PATENTS

| | | | |
|---|---|---|---|
| 2,706,792 | 4/1955 | Jacobs | 250—83.3 |
| 2,798,989 | 7/1957 | Welker | 317—237 |
| 2,908,871 | 10/1959 | McKay | 331—108 |
| 2,956,913 | 10/1960 | Mack et al. | 148—1.5 |
| 2,957,789 | 10/1960 | Pell | 148—1.5 |
| 2,988,639 | 6/1961 | Welker et al. | 250—83.3 |
| 2,991,366 | 7/1961 | Salzberg | 250—83.3 |
| 3,016,313 | 1/1962 | Pell | 317—235 |

RALPH G. NILSON, *Primary Examiner.*

JAMES W. LAWRENCE, *Examiner.*